US011023793B2

United States Patent
Hirano (10) Patent No.: US 11,023,793 B2
(45) Date of Patent: Jun. 1, 2021

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Tsubasa Hirano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 16/167,826

(22) Filed: Oct. 23, 2018

(65) Prior Publication Data

US 2019/0147309 A1  May 16, 2019

(30) Foreign Application Priority Data

Nov. 10, 2017  (JP) .............................. JP2017-217511

(51) Int. Cl.
| | |
|---|---|
| *G06K 19/06* | (2006.01) |
| *H04L 29/06* | (2006.01) |
| *H04W 76/10* | (2018.01) |
| *H04W 12/08* | (2021.01) |
| *G06F 3/0484* | (2013.01) |
| *G06F 3/03* | (2006.01) |

(52) U.S. Cl.
CPC ..... *G06K 19/06037* (2013.01); *G06F 3/0304* (2013.01); *G06F 3/04847* (2013.01); *H04L 63/064* (2013.01); *H04L 63/08* (2013.01); *H04L 63/168* (2013.01); *H04L 63/18* (2013.01); *H04W 12/08* (2013.01); *H04W 76/10* (2018.02)

(58) Field of Classification Search
CPC ........... G06K 19/06037; H04W 76/10; H04W 12/00522
See application file for complete search history.

(56) References Cited

U.S. PATENT DOCUMENTS

| | | | |
|---|---|---|---|
| 2006/0208088 A1* | 9/2006 | Sekiguchi | ............... H04L 63/06 235/472.02 |
| 2011/0150266 A1* | 6/2011 | Hohndel | ................. G06F 21/31 382/100 |

(Continued)

FOREIGN PATENT DOCUMENTS

JP         2016-146611 A     8/2016

*Primary Examiner* — Christopher C Harris
(74) *Attorney, Agent, or Firm* — Venable LLP (57) ABSTRACT

A communication apparatus accepts from a user a display setting regarding a two-dimensional code in which one or more parameters related to communication with a communication apparatus are encoded, and determines a parameter set that includes one or more parameters to be encoded in the two-dimensional code related to communication with the communication apparatus. When the accepted display setting is a first setting, a first two-dimensional code for a first application in which a first parameter set corresponding to the first setting is encoded is displayed, and when the accepted display setting is a second setting, a second two-dimensional code for a second application in which a second parameter set corresponding to the second setting is encoded and which is different from the first two-dimensional code is displayed, and wherein the first two-dimensional code includes a parameter that is not included in the second two-dimensional code.

11 Claims, 8 Drawing Sheets

(56) References Cited

U.S. PATENT DOCUMENTS

| | | | |
|---|---|---|---|
| 2012/0158922 A1* | 6/2012 | Aggarwal | H04W 12/08 |
| | | | 709/220 |
| 2013/0276075 A1* | 10/2013 | Gong | H04W 12/08 |
| | | | 726/5 |
| 2014/0117100 A1* | 5/2014 | Black | G07F 19/20 |
| | | | 235/494 |
| 2014/0282924 A1* | 9/2014 | Singhal | H04L 63/0853 |
| | | | 726/5 |
| 2015/0108220 A1* | 4/2015 | Gu | G06K 7/1447 |
| | | | 235/462.11 |
| 2015/0245281 A1* | 8/2015 | Beguin | H04W 48/16 |
| | | | 370/255 |
| 2015/0249656 A1* | 9/2015 | Wu | H04W 12/06 |
| | | | 726/7 |
| 2016/0078333 A1* | 3/2016 | Simske | G06K 19/06056 |
| | | | 235/462.04 |
| 2016/0085975 A1* | 3/2016 | Dar | G06F 21/62 |
| | | | 726/27 |
| 2016/0360561 A1* | 12/2016 | Lee | H04N 5/23206 |
| 2017/0078876 A1* | 3/2017 | Jiang | H04W 12/04 |
| 2017/0192723 A1* | 7/2017 | Ichikawa | H04W 4/80 |
| 2018/0004929 A1 | 1/2018 | Sakai | |

* cited by examiner

WIFI:S:WIFI11;T:WEP;P:abcdefgh;;

F I G. 3B cname=ABC<LF>
ip=192.168.0.2<LF>
mac=2C9EFC4E05D8<LF>
ssid=WIFI11<LF>
key=abcdefgh

F I G. 3C

WIFI:S:WIFI11;T:WEP;P:abcdefgh;;IP:192.168.0.2

FIG. 4A

```
DISPLAYED QR CODE SETTINGS

☑ FOR STANDARD          ☐ FOR PROPRIETARY
      APPLICATION              APPLICATION

☐ APPLICATION           ☐ DISPLAY ALONGSIDE
      COMMON QR CODE

[ DECIDE ]
```

FIG. 4B

```
DISPLAYED QR CODE SETTINGS (PERSONAL SETTING)

☑ FOR STANDARD          ☐ FOR PROPRIETARY
      APPLICATION              APPLICATION

☐ APPLICATION           ☐ DISPLAY ALONGSIDE
      COMMON QR CODE

[ DECIDE ]
```

FIG. 5A

WIRELESS COMMUNICATION PARAMETER DISPLAY

IP Address: 192.168.0.2
SSID: WIFI11
NETWORK KEY: abcdefgh

WIRELESS COMMUNICATION PARAMETER DISPLAY

IP Address: 192.168.0.2
SSID: WIFI11
NETWORK KEY: abcdefgh

QR CODE FOR STANDARD APPLICATION

QR CODE FOR PROPRIETARY APPLICATION

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

A technique for using a two-dimensional code such as a QR code to provide a mobile terminal such as a smartphone with wireless communication parameters used to connect to a communication apparatus such as a printer or a multifunction peripheral (MFP) is known. Japanese Patent Laid-Open No. 2016-146611 proposes a technique in which a printer displays a QR code in which wireless communication parameters such as an SSID, an encryption method, and a passphrase are encoded, and a mobile terminal captures the QR code to obtain the wireless communication parameters included in the displayed QR code. In accordance with such a technique, it is possible for a mobile terminal to easily obtain wireless communication parameters for a wireless LAN connection by using a two-dimensional code such as a QR code, and perform a wireless communication setting.

Data included in a two-dimensional code displayed by a communication apparatus for the provision of wireless communication parameters, as described above, needs to be generated in a format supported by an application used for reading the two-dimensional code and a wireless communication setting. Such an application is provided (distributed) from a vendor of a communication apparatus, for example, to a mobile terminal.

However, in a case where the data formats that a plurality of applications provided from different vendors are able to read are respectively different, the communication apparatus is required to, for each application, be able to generate a two-dimensional code by encoding data of a corresponding format. With such a configuration, in a case of being able to generate a plurality of two-dimensional codes corresponding to respectively different applications, the communication apparatus needs to appropriately control display of the plurality of two-dimensional codes.

SUMMARY OF THE INVENTION

The present invention was conceived in view of the above described issues. The present invention appropriately controls display of a plurality of two-dimensional codes corresponding to different applications.

According to one aspect of the present invention, there is provided a communication apparatus, comprising: an acceptance unit configured to accept from a user a setting regarding display of a two-dimensional code in which a wireless communication parameter for connecting to a communication apparatus is encoded and which is to be read by an application that operates on a mobile terminal; a display control unit configured to perform display control for displaying the two-dimensional code on a display unit of the communication apparatus, the display control unit selecting, in accordance with the setting accepted by acceptance unit, whether to display at least one of a first two-dimensional code that can be read by a first application or a second two-dimensional code that can be read by a second application different to the first application, or to display a third two-dimensional code that can be read by both of the first and second applications.

According to another aspect of the present invention, there is provided a method of controlling a communication apparatus, the method comprising: accepting from a user a setting regarding display of a two-dimensional code in which a wireless communication parameter for connecting to a communication apparatus is encoded and which is to be read by an application that operates on a mobile terminal; performing display control for displaying the two-dimensional code on a display unit of the communication apparatus, and selecting, in accordance with the accepted setting, whether to display at least one of a first two-dimensional code that can be read by a first application or a second two-dimensional code that can be read by a second application different to the first application, or to display a third two-dimensional code that can be read by both of the first and second applications.

According to still another aspect of the present invention, there is provided a non-transitory computer-readable storage medium storing a computer program for causing a computer to execute a method of controlling a communication apparatus, the method comprising: accepting from a user a setting regarding display of a two-dimensional code in which a wireless communication parameter for connecting to a communication apparatus is encoded and which is to be read by an application that operates on a mobile terminal; performing display control for displaying the two-dimensional code on a display unit of the communication apparatus, and selecting, in accordance with the accepted setting, whether to display at least one of a first two-dimensional code that can be read by a first application or a second two-dimensional code that can be read by a second application different to the first application, or to display a third two-dimensional code that can be read by both of the first and second applications.

By virtue of the present invention, it is possible to appropriately control display of a plurality of two-dimensional codes corresponding to different applications.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
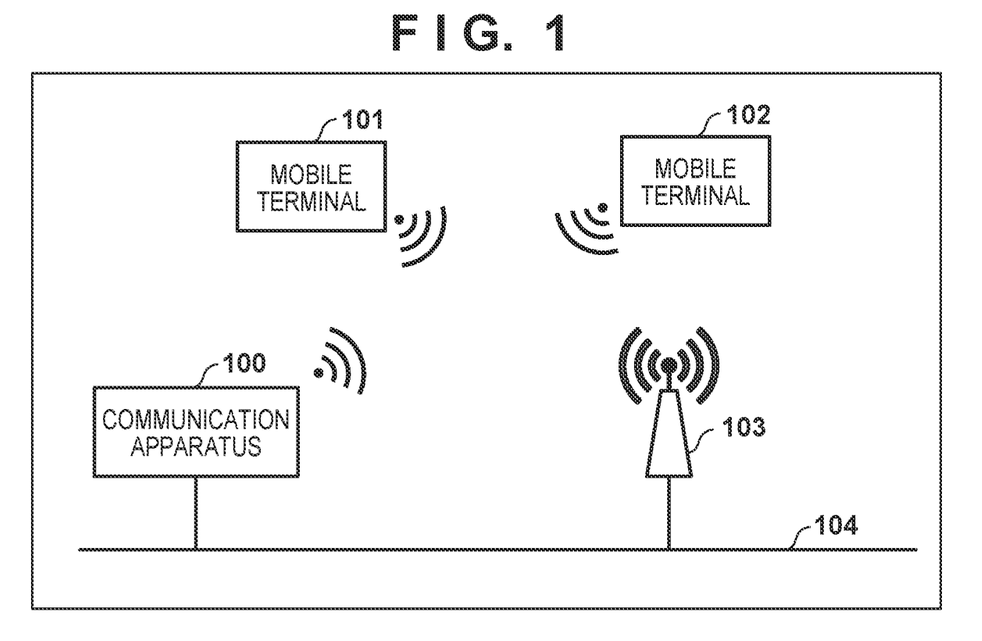
FIG. 1 illustrates an example of a configuration of a communication system.

FIG. 1 illustrates an example of a configuration of a communication system according to embodiments of the present invention. As illustrated in FIG. 1, the communication system includes a communication apparatus 100, and mobile terminals 101 and 102. The communication apparatus 100 is connected to a LAN 104 which is a wired network, and is connected to an access point 103 via the LAN 104. The access point 103 is a wireless access point that supports a wireless LAN standard such as IEEE 802.11a/b/g/n/ac.

The communication apparatus 100 of the present embodiment is a multi-function peripheral (MFP) having a plurality of functions such as a print function, a scanning function, a copy function, and a communication function, but it may be a printing apparatus (a printer), a facsimile (FAX) apparatus, a copying machine, a reading apparatus (a scanner), or the like. The communication apparatus 100 has a personalization function. The personalization function is a function that enables settings to be customized for each user, by storing settings for each user, and reflecting the stored settings for the corresponding user when they log in.

The mobile terminals 101 and 102 of the present embodiment are smartphones, but may be mobile terminals having a wireless communication function, such as a portable phone, a tablet PC, or a notebook PC. A plurality of applications are installed on the mobile terminals 101 and 102, including an application for reading a two-dimensional code by capturing the two-dimensional code using a camera.

<Communication Apparatus>

Figure 2:
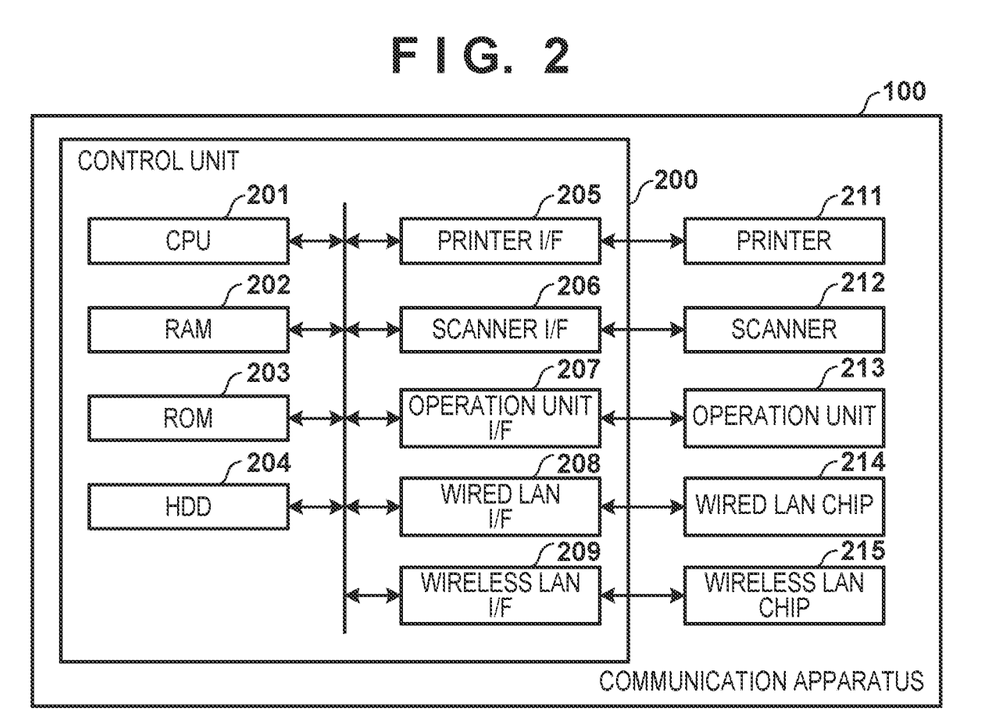
FIG. 2 illustrates an example of a hardware configuration of a communication apparatus.

FIG. 2 is a block diagram for illustrating an example of a hardware configuration of the communication apparatus 100. The communication apparatus 100 is provided with a control unit 200, as well as a printer 211, a scanner 212, an operation unit 213, a wireless LAN chip 215, and a wired LAN chip 214 that are connected to the control unit 200. The control unit 200 controls each device connected to the control unit 200 to realize various functions in the communication apparatus 100, such as the print function, the scanning function, the copy function, and the communication function. As devices connected to a system bus, the control unit 200 is provided with a CPU 201, a RAM 202, a ROM 203, a hard disk drive (HDD) 204, a printer interface (I/F) 205, a scanner I/F 206, an operation unit I/F 207, a wired LAN I/F 208, and a wireless LAN I/F 209.

The CPU 201 controls operation of the communication apparatus 100 as a whole by controlling each device that is connected via the system bus. The RAM 202 is used as a temporary storage area, such as a work area or a main memory of the CPU 201. The ROM 203 stores a control program of the communication apparatus 100. The CPU 201 reads a control program stored in the ROM 203 into the RAM 202 and executes the control program to thereby execute various processing for controlling the operation of the communication apparatus 100. The HDD 204 stores various programs and various kinds of data such as print data or image data. Note that, in the present embodiment, description is given of an example in which one CPU 201 executes processing (illustrated in each flowchart) that is described later, but limitation is not made to this, and the communication apparatus 100 can be configured so that a plurality of CPUs (processors) cooperate to execute the processing.

The printer 211 executes print processing based on image data outputted from the control unit 200. The communication apparatus 100 can cause the printer 211 to execute print processing based on print data received from an external apparatus such as the mobile terminals 101 and 102, or image data generated by the scanner 212. The scanner 212 generates image data (scanned image data) by reading an image of an original. The image data generated by the scanner 212 is used in print processing by the printer 211, or saved in the HDD 204. The operation unit 213 is provided with a keyboard and a liquid crystal display unit having a touch panel function, and displays various screens. A user can input information or an instruction with respect to the communication apparatus 100 via the operation unit 213.

The wired LAN chip 214 is connected to a wired LAN (the LAN 104), and is a communication chip for realizing communication via the wired LAN. The wired LAN I/F 214 controls the wired LAN chip 214 to communicate with an external apparatus via the wired LAN. The wireless LAN chip 215 is a communication chip for realizing wireless communication (wireless LAN communication) according to a wireless LAN standard. The wireless LAN I/F 209 controls the wireless LAN chip 215 to realize wireless LAN communication with an external access point (a relay apparatus), or an external apparatus such as the mobile terminals 101 and 102. The wireless LAN I/F 209 and the wireless LAN chip 215 support a wireless LAN standard such as IEEE 802.11a/b/g/n/ac.

The wireless LAN I/F 209 can operate in an infrastructure connection mode for connecting to an external apparatus via an external access point, or in a direct connection mode for making a direct wireless connection to an external apparatus without going through an access point. In a case of operating in the direct connection mode, the communication apparatus 100 functions as an access point for a wireless LAN. Note that the direct connection mode is realized by Wi-Fi Direct or an access point mode (a software access point mode), for example.

<Two-Dimensional Code>

In the present embodiment, a QR code is used as an example of a two-dimensional code (a two-dimensional barcode) that can be displayed on the operation unit 213 in the communication apparatus 100, and can be read by the mobile terminals 101 and 102. However, a two-dimensional code is not limited to a QR code, and may be a two-dimensional code such as Data Matrix or PDF417.

The mobile terminals 101 and 102 are installed with a smartphone standard application (hereinafter abbreviated as a "standard application") or a proprietary vendor application (hereinafter abbreviated as a "proprietary application") of the communication apparatus 100, as applications for reading a QR code (a two-dimensional code). In the present embodiment, as an example, a case where the mobile terminal 101 uses the standard application to read a QR code, and the mobile terminal 102 uses the proprietary application to read a QR code is envisioned.

Figure 3A:
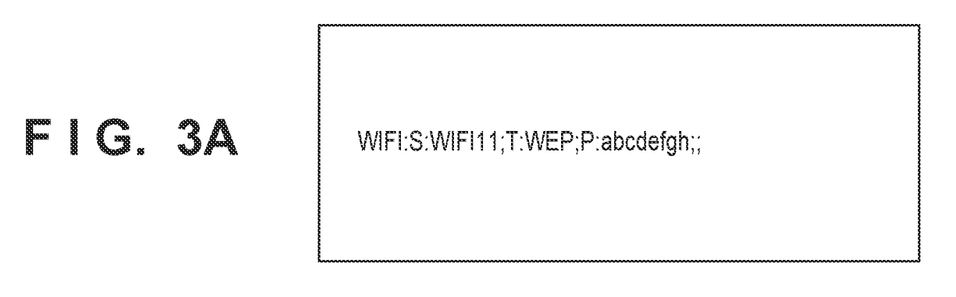
FIG. 3A through FIG. 3C illustrate examples of data encoded in a QR code.
Figure 3B:
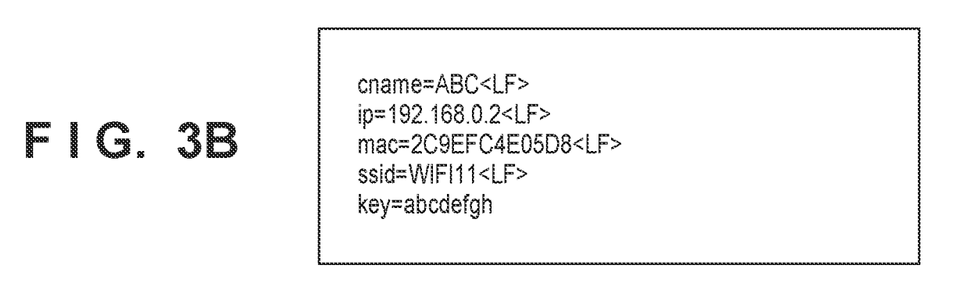
Figure 3C:
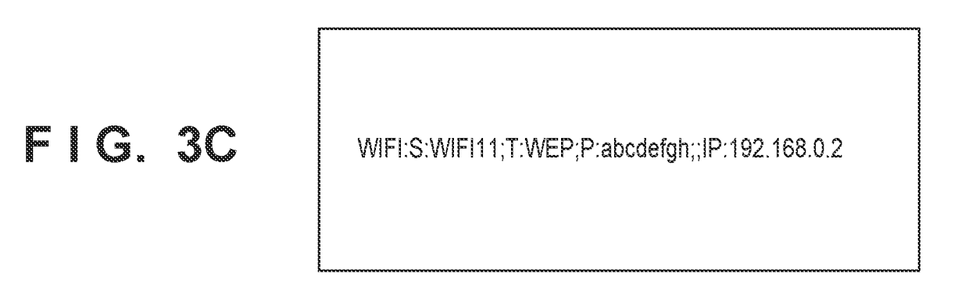

With reference to FIG. 3A through FIG. 3C, description is given regarding QR codes and data samples. The communication apparatus 100 can generate a QR code for the standard application (a first two-dimensional code) that can be read by the standard application, and a QR code for the proprietary application (a second two-dimensional code) that can be read by the proprietary application which differs from the standard application. The communication apparatus 100 can also generate a common QR code (a third two-dimensional code) that can be read by both of the standard application and the proprietary application. Each generated QR code includes wireless communication parameters, in an encoded state, for connecting to the communication apparatus 100. The wireless communication parameters are parameters necessary for the mobile terminals 101 and 102 to make wireless connections with the access point 103 which can communicate with the communication apparatus 100 via the LAN 104, for example. Alternatively, the wireless communication parameters may be parameters necessary for the mobile terminals 101 and 102 to make direct wireless connections with the communication apparatus 100.

FIG. 3A illustrates an example of data that is encoded in a QR code for the standard application. The QR code for the standard application includes at least an SSID, an encryption method, and a passphrase. In the example of FIG. 3A, the QR code includes "WIFI11" as the SSID, "WEP" as the encryption method, and "abcdefgh" as the passphrase. The QR code for the standard application can be read by the standard application which operates on the mobile terminal 101.

FIG. 3B illustrates an example of data that is encoded in a QR code for the proprietary application. Note that "<LF>" indicates a character code for a new line. The QR code for the proprietary application includes a company name, as well as the IP address, the MAC address, the SSID, and the passphrase of the communication apparatus 100, for example. In the example of FIG. 3B, the QR code includes "ABC" as the company name, "192.168.0.2" as the IP address, "2C9EFC4E05D8" as the MAC address, "WIFI11" as the SSID, and "abcdefgh" as the passphrase. The QR code for the proprietary application can be read by the proprietary application which operates on the mobile terminal 102.

FIG. 3C illustrates an example of data that is encoded in a common QR code. The application common QR code includes at least some of the data (wireless communication parameters) included in the QR code for the standard application, and at least some of the data (wireless communication parameters) included in the QR code for the proprietary application. In the example of FIG. 3C, the common QR code includes the SSID, the encryption method, the passphrase, and the IP address ("WIFI11", "WEP", "abcdefgh", and "192.168.0.2"). In this example, data for the proprietary application (IP address) is added after the data for the standard application (SSID, encryption method, and passphrase).

Ordinarily, the standard application can only read (decode) the data portion for the standard application, and does not read the additional data. However, depending on the version of the standard application, there may be cases where the standard application cannot successfully read the QR code if unnecessary data is added after the data portion for the standard application.

In addition, the proprietary application can read the QR code for the proprietary application and the common QR code. However, there may be cases where an application of an older version cannot read the common QR code. In such a case, it may be sufficient if it is possible to realize reading of the common QR code by the proprietary application by a version update of the proprietary application. In a case where a version update is not possible due to any kind of situation in the mobile terminal 102, the QR code for the proprietary application needs to be used.

The communication apparatus 100 of the present embodiment performs the following processing to appropriately control display of a plurality of two-dimensional codes (QR codes) that correspond to different applications. The CPU 201 of the communication apparatus 100 accepts, from a user, a setting regarding display of QR codes to be read by the applications that operate on the mobile terminals 101 and 102, where the QR codes in which wireless communication parameters for making connections to the communication apparatus 100 are encoded. Furthermore, the CPU 201 of the communication apparatus 100 performs display control for displaying a QR code on a display unit (the operation unit 213) in accordance with a setting accepted from a user. As this display control, the CPU 201 performs control for displaying at least one of a QR code for the standard application or a QR code for the proprietary application. Alternatively, as display control, the CPU 201 performs control for selecting whether to display a common QR code, or to display at least one of a QR code for the standard application or a QR code for the proprietary application. In the following first to third embodiments, description is given regarding concrete examples for realizing the foregoing processing.

First Embodiment

In the first and second embodiments, the CPU 201, in accordance with a setting accepted from a user, performs display control for selecting display of a QR code for the standard application, display of QR codes for the standard application and the proprietary application alongside one another, or display of a common QR code. Firstly, in the first embodiment, description is given regarding an example of performing a display setting for a QR code in accordance with a setting (an administrator setting) by a user (an administrator) having an administrator authority in the communication apparatus 100. Specifically, the CPU 201 causes a storage device such as the HDD 204 to store a display setting accepted from the administrator, and performs the foregoing display control in accordance with the display setting stored in the storage device.

<Administrator Setting>

Figure 4A:
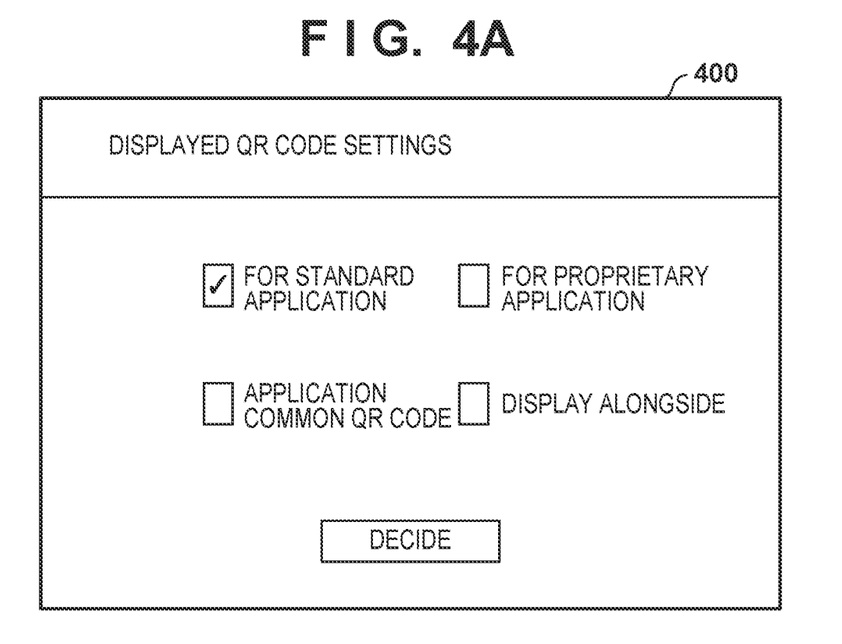
FIG. 4A and FIG. 4B illustrate examples of setting screens for accepting a setting regarding display of a QR code.

FIG. 4A illustrates an example of a setting screen for accepting a setting (a display setting) regarding display of a QR code, from an administrator of the communication apparatus 100. On a setting screen 400 illustrated in FIG. 4A, it is possible to set a method for displaying a QR code, when displaying wireless communication parameters together with the QR code. The administrator can select one option in the setting screen 400, out of "for standard application", "for proprietary application", "application common QR code", and "display alongside". When the administrator selects one option and presses a "decide" button, the CPU 201 causes the HDD 204 to store the selected setting as the setting of the method for displaying a QR code.

Setting by an administrator is performed in the following way, for example. In a case where a user of the communication apparatus 100 uses only the standard application, "for standard application" which is the option for displaying the QR code for the standard application is set. Alternatively, "application common QR code", which is the option for displaying a common QR code that can be read by both of the standard application and the proprietary application is set. In addition, in a case where a user of the communication apparatus 100 uses only the proprietary application, "for proprietary application" which is the option for displaying the QR code for the proprietary application, or "application common QR code" is set. In addition, "application common QR code" is set in a case where there are users who use the standard application and the proprietary application.

However, there may be cases where the common QR code cannot be read by an application, due to the version of the application (the standard application or the proprietary application) that operates on a mobile terminal, as described above. In such a case, in a case where there are users who use both of the standard application and the proprietary application, "display alongside" which is the option to display the QR code for the standard application and the QR code for the proprietary application alongside one another is set.

<Processing Procedure>

Figure 6:
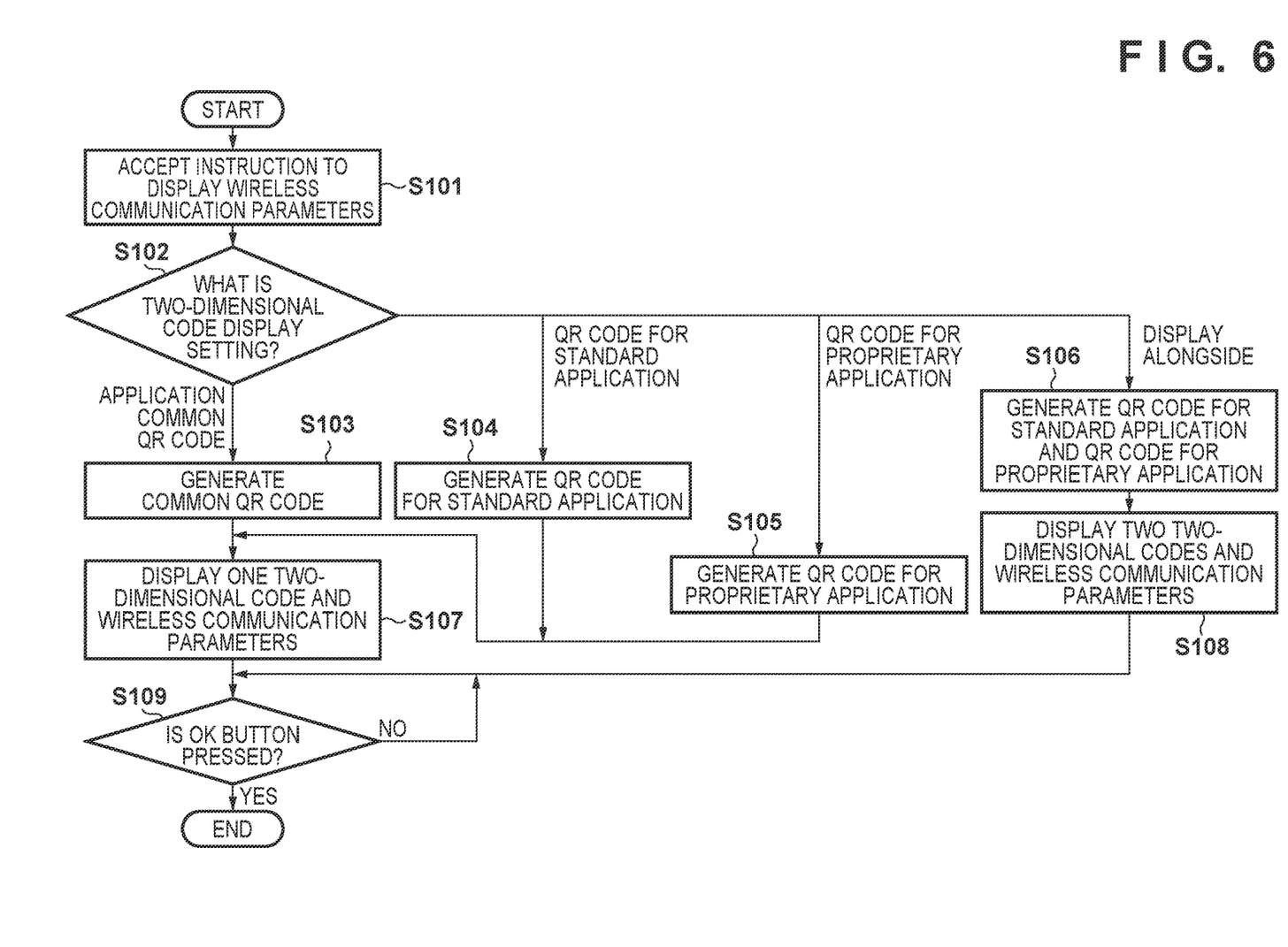
FIG. 6 is a flowchart for illustrating a procedure of processing for displaying wireless communication parameters.

FIG. 6 is a flowchart for illustrating a procedure for processing for displaying wireless communication parameters in the communication apparatus 100 according to the present embodiment. The processing of each step of FIG. 6 is realized by the CPU 201 reading a program from the ROM 203 or the HDD 204 and executing it. Note that, before execution of the processing of FIG. 6 is started, an administrator of the communication apparatus 100 uses the setting screen 400 exemplified by FIG. 4A to perform in advance the display setting for a QR code to be displayed together with wireless communication parameters. In addition, the wireless communication parameters necessary for generation of a QR code are set in advance by an administrator, and stored in the RAM 202 or the HDD 204.

When the communication apparatus 100 is activated from a powered off state, the CPU 201 starts execution of processing in accordance with the procedure of FIG. 6. In step S101, the CPU 201 awaits a wireless communication parameter display instruction from a user. The CPU 201 accepts the display instruction from the user via the operation unit 213, for example. Upon accepting the display instruction, the CPU 201, next in step S102, confirms QR code (two-dimensional code) display settings that are stored in the HDD 204. Furthermore, the CPU 201 determines which of "for standard application", "for proprietary application", "application common QR code", and "display alongside" is selected.

If "application common QR code" is selected, the CPU 201 advances the processing from step S102 to step S103. In step S103, the CPU 201 uses the wireless communication parameters for generation of the common QR code (in the present embodiment, an SSID, a passphrase, an encryption method, and the IP address of the communication apparatus 100) to generate an application common QR code. If "for standard application" is selected, the CPU 201 advances the processing from step S102 to step S104. In step S104, the CPU 201 uses the wireless communication parameters for generation of the QR code for the standard application (in the present embodiment, the SSID, the passphrase, and the encryption method) to generate the QR code for the standard application.

If "for proprietary application" is selected, the CPU 201 advances the processing from step S102 to step S105. In step S105, the CPU 201 uses the wireless communication parameters for the proprietary application (in the present embodiment, the SSID, the passphrase, the encryption method, and the IP address) to generate the QR code for the proprietary application. If "display alongside" is selected, the CPU 201 advances the processing from step S102 to step S106. In step S106, the CPU 201 generates the QR code for the standard application similarly to in step S104, and generates the QR code for the proprietary application similarly to in step S105.

Figure 5A:
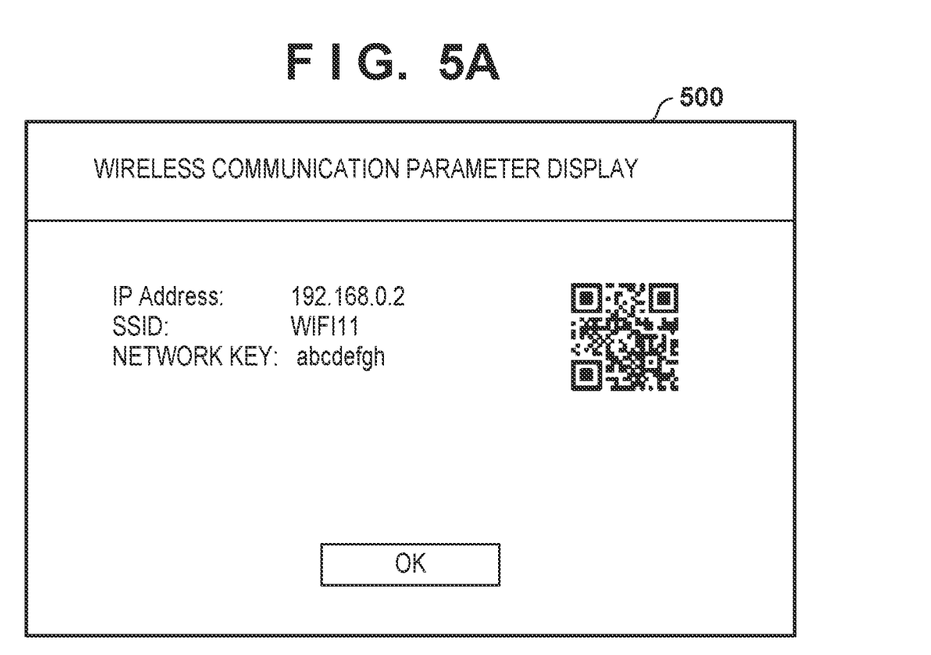
FIG. 5A through FIG. 5C illustrate examples of screens for displaying wireless communication parameters together with QR codes.
Figure 5B:
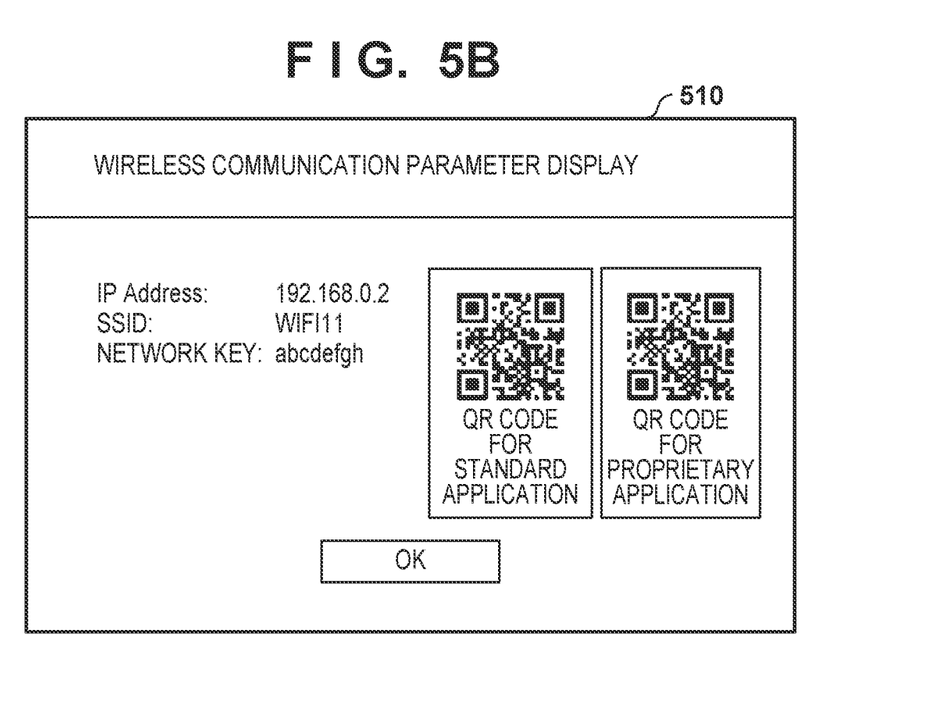

After the processing of step S103, step S104, or step S105, the CPU 201, next in step S107, displays the wireless communication parameter and the generated single QR code on the operation unit 213. For example, the CPU 201 displays the operation screen 500 as illustrated by FIG. 5A on the operation unit 213. Meanwhile, after the processing of step S106, the CPU 201, next in step S108, displays the wireless communication parameter on the operation unit 213 together with displaying the two generated QR codes on the operation unit 213 alongside each other. For example, the CPU 201 displays an operation screen 510 as illustrated by FIG. 5B on the operation unit 213.

The mobile terminals 101 and 102 can use the standard application or the proprietary application to capture a QR code included in the operation screen 500 or 510 displayed on the operation unit 213, and obtain the wireless communication parameters included in the QR code. In such a case, a user causes their mobile terminal to capture a QR code supported by an application installed on the mobile terminal (the standard application in the case of the mobile terminal 101, for example). By this, it is possible to cause the mobile terminal to obtain the wireless communication parameters by decoding the QR code. The mobile terminals 101 and 102 can use the obtained wireless communication parameters to attempt a process for connecting to the communication apparatus 100.

In a case where a QR code displayed on the operation unit 213 includes wireless communication parameters for making a wireless connection to the access point 103, the mobile terminals 101 and 102 can use obtained wireless communication parameters to make wireless connections to the access point 103. In such a case, the mobile terminals 101 and 102 connect to the communication apparatus 100 via the access point 103. In contrast, in a case where a QR code displayed on the operation unit 213 includes wireless communication parameters for making a direct wireless connection to the communication apparatus 100, the mobile terminals 101 and 102 can use obtained wireless communication parameters to make wireless connections directly to the communication apparatus 100. Upon successfully connecting with the communication apparatus 100, the mobile terminals 101 and 102 can transmit an instruction such as a print instruction or a scan instruction to the communication apparatus 100, for example.

After the processing of step S107 or step S108, in step S109, the CPU 201 ends the processing when an OK button in the operation screen displayed on the operation unit 213 is pressed.

As described above, in the present embodiment, the CPU 201 accepts a QR code display setting from an administrator, via the setting screen 400. Furthermore, in accordance with the display setting, the CPU 201 performs display control for selecting display of the QR code for the standard application, display of the QR codes for the proprietary application and for the standard application alongside each other, or display of the common QR code. With this arrangement, in a communication apparatus 100 that can generate a plurality of QR codes that include wireless communication parameters, it is possible to appropriately display on the operation unit 213 a QR code corresponding to an application that is used to read QR codes and that operates on a mobile terminal.

Second Embodiment

Next, in the second embodiment, description is given regarding an example in which QR code display settings are made as a personal setting for each user of the communication apparatus 100. Specifically, the CPU 201 causes a storage device such as the HDD 204 to store a display setting accepted via a setting screen 410 (FIG. 4B), for each user that can log in to the communication apparatus 100. Furthermore, the CPU 201 performs QR code display control in accordance with a display setting that is stored in the storage device and corresponds to a user who is logged-in to the communication apparatus 100. Note that mainly differences with the first embodiment are described below.

<User Settings>

Figure 4B:
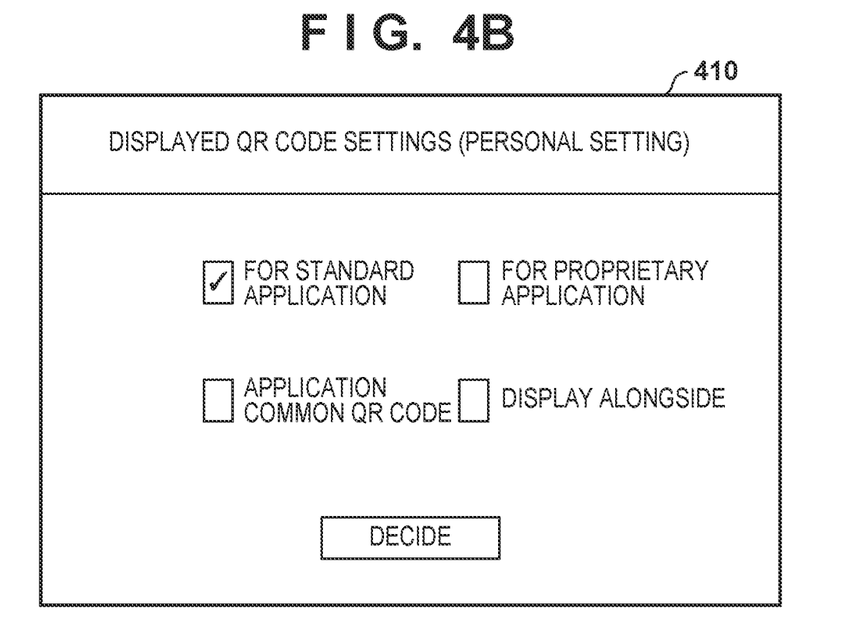

FIG. 4B illustrates an example of a setting screen for accepting a setting (a display setting) regarding display of a QR code, from each user of the communication apparatus 100. On the setting screen 410 illustrated in FIG. 4B, it is possible to set a method for displaying a QR code, when displaying wireless communication parameters together with the QR code, similarly to in the setting screen 400.

The setting screen 410 can be operated by a user who is logged in to the communication apparatus 100. The CPU 201 causes the HDD 204 to store a setting made by using the setting screen 410 as a personal setting of the logged-in user, in accordance with a personalization function of the communication apparatus 100. A setting made by a user depends on the application for reading QR codes installed on the mobile terminal that the user uses, and may be performed with a similar perspective as the setting made by an administrator that was described in the first embodiment. Upon accepting an instruction to display wireless communication parameters in a state where a user is logged in to the communication apparatus 100, the CPU 201 performs QR code display control in accordance with the personal setting for the user that is stored in the HDD 204.

<Processing Procedure>

Figure 7:
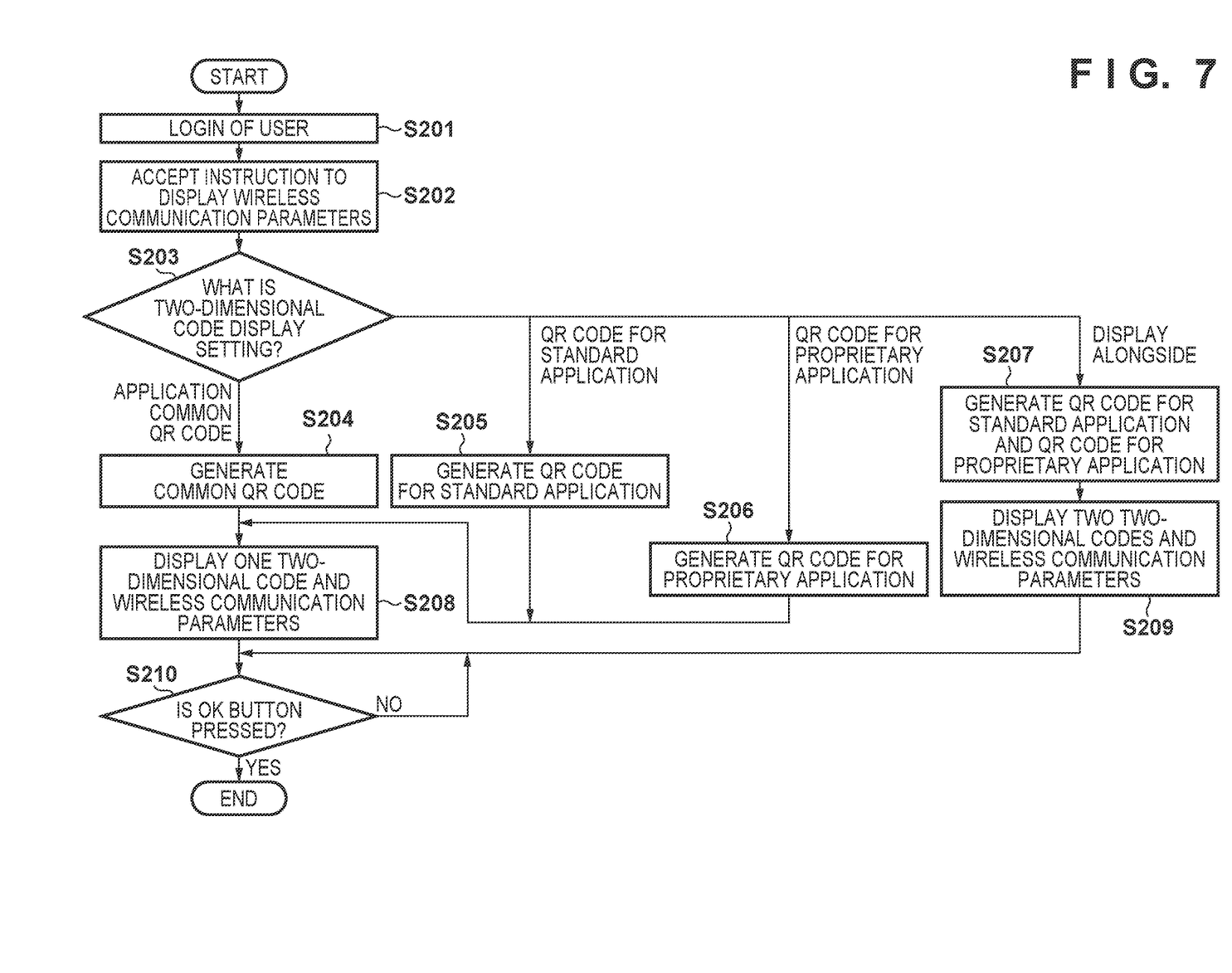
FIG. 7 is a flowchart for illustrating a procedure of processing for displaying wireless communication parameters.

FIG. 7 is a flowchart for illustrating a procedure for processing for displaying wireless communication parameters in the communication apparatus 100 according to the present embodiment. The processing of each step of FIG. 7 is realized by the CPU 201 reading a program from the ROM 203 or the HDD 204 and executing it. Note that, before execution of the processing of FIG. 7 is started, each user of the communication apparatus 100 uses the setting screen 410 exemplified by FIG. 4B to perform in advance the display setting for a QR code to be displayed together with wireless communication parameters. In addition, the wireless communication parameters necessary for generation of a QR code are set in advance, and stored in the RAM 202 or the HDD 204.

When the communication apparatus 100 is activated from a powered off state, the CPU 201 starts execution of processing in accordance with the procedure of FIG. 7. In step S201, the CPU 201 accepts the login of a user to the communication apparatus 100. If login of the user succeeds, the CPU 201 advances the processing to step S202. In step S202, upon accepting an instruction to display wireless communication parameters from the logged-in user, the CPU 201 advances the processing to step S203.

In step S203, the CPU 201 confirms the QR code (two-dimensional code) display settings (personal settings) that correspond to the logged-in user and are stored in the HDD 204. By this, the CPU 201 determines which of "for standard application", "for proprietary application", "application common QR code", and "display alongside" is selected. As a result of the determination in accordance with step S203, the CPU 201 advances to the processing of one of step S204 through step S207. Note that, in step S204 through step S207, processing respectively the same as step S103 through step S106 (FIG. 6) of the first embodiment is performed. Furthermore, in step S208 through step S210, processing respectively the same as step S107 through step S109 of the first embodiment is performed.

By virtue of the present embodiment as described above, it is possible to use the personalization function of the communication apparatus 100 to execute a QR code display corresponding to an application used for reading that operates on a mobile terminal, in accordance with personal settings for each user of the communication apparatus 100. By this, in the communication apparatus 100, it is possible to appropriately display on the operation unit 213 a QR code that corresponds to an application used to read QR codes that operates on a mobile terminal.

Third Embodiment

Next, in the third embodiment, description is given regarding an example for, on an operation screen for displaying wireless communication parameters, making it possible to switch a QR code being displayed in accordance with an operation by a user. Specifically, via an operation screen for displaying wireless communication parameters that is displayed on the operation unit 213, the CPU 201 accepts a display instruction for instructing display of one out of the QR code for the standard application, the QR code for the proprietary application, and the common QR code. This operation screen displays QR codes in which wireless communication parameters are encoded. In accordance with the accepted display instruction, the CPU 201 performs display control for switching display of the QR code in the operation screen between the QR code for the standard application, the QR code for the proprietary application, and the common QR code. Note that mainly differences with the first embodiment are described below.

<Processing Procedure>

Figure 8:
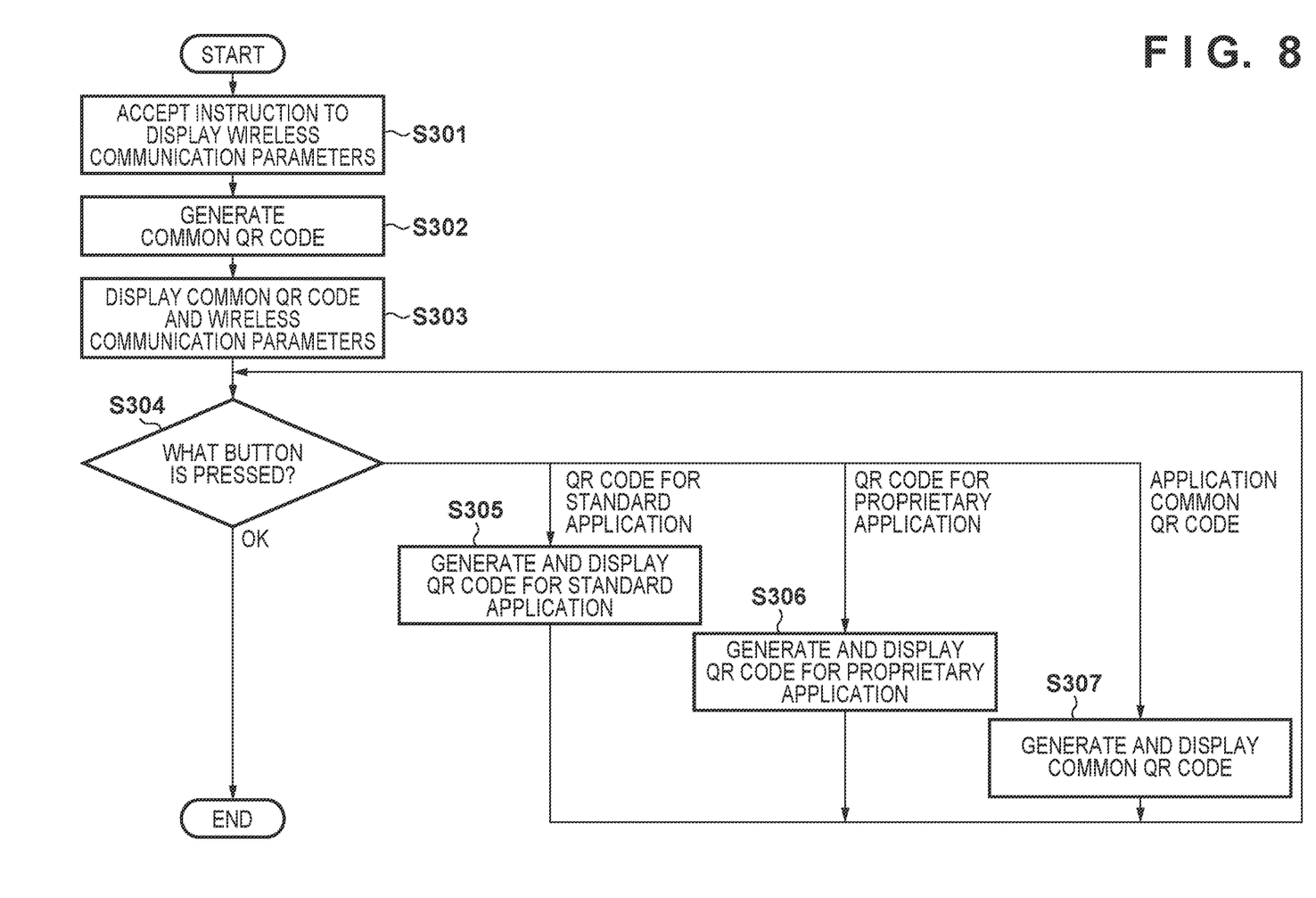
FIG. 8 is a flowchart for illustrating a procedure of processing for displaying wireless communication parameters.

FIG. 8 is a flowchart for illustrating a procedure for processing for displaying wireless communication parameters in the communication apparatus 100 according to the present embodiment. The processing of each step of FIG. 8 is realized by the CPU 201 reading a program from the ROM 203 or the HDD 204 and executing it. Note that the wireless communication parameters necessary for generation of a QR code are set in advance, and stored in the RAM 202 or the HDD 204.

Figure 5C:
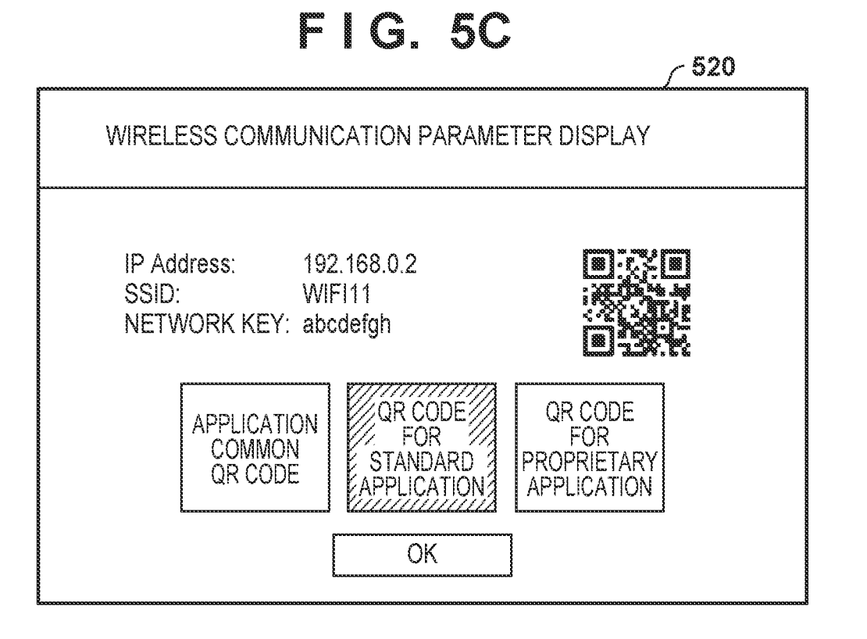

When the communication apparatus 100 is activated from a powered off state, the CPU 201 starts execution of processing in accordance with the procedure of FIG. 8. In step S301, the CPU 201 awaits a wireless communication parameter display instruction from a user. The CPU 201 accepts the display instruction from the user via the operation unit 213, for example. Upon accepting the display instruction, the CPU 201, next in step S302, generates the common QR code similarly to in step S103. Furthermore, in step S303, the CPU 201 displays the wireless communication parameters and the generated common QR code on the operation unit 213. For example, the CPU 201 displays an operation screen 502 as illustrated by FIG. 5C on the operation unit 213.

Subsequently, in step S304, the CPU 201 awaits a display instruction for instructing display of one out of the QR code for the standard application, the QR code for the proprietary application, and the common QR code on an operation screen 520. Specifically, the CPU 201 determines which of a "QR code for standard application" button, a "QR code for proprietary application" button, and an "application common QR code" button is pressed.

The CPU 201 advances the processing to step S305 if the "QR code for standard application" button is pressed on the operation screen 520 in step S304. In step S305, the CPU 201 uses the wireless communication parameters for generation of the QR code for the standard application (in the present embodiment, the SSID, the passphrase, and the encryption method) to generate the QR code for the standard application. Furthermore, the CPU 201 changes the QR code displayed on the operation screen 520 to the generated QR code. Note that, if the generated QR code is already displayed, display of the QR code continues. Subsequently, the CPU 201 returns the processing to step S304.

The CPU 201 advances the processing to step S306 if the "QR code for proprietary application" button is pressed on the operation screen 520 in step S304. In step S306, the CPU 201 uses the wireless communication parameters for the proprietary application (in the present embodiment, the SSID, the passphrase, the encryption method, and the IP address) to generate the QR code for the proprietary application. Furthermore, the CPU 201 changes the QR code displayed on the operation screen 520 to the generated QR code. Note that, if the generated QR code is already displayed, display of the QR code continues. Subsequently, the CPU 201 returns the processing to step S304.

The CPU 201 advances the processing to step S307 if the "application common QR code" button is pressed on the operation screen 520 in step S304. In step S307, the CPU 201 generates the common QR code, similarly to in step S302. Furthermore, the CPU 201 changes the QR code displayed on the operation screen 520 to the generated QR code. Note that, if the generated QR code is already displayed, display of the QR code continues. Subsequently, the CPU 201 returns the processing to step S304.

If the OK button is pressed on the operation screen 520 in step S304, the CPU 201 ends the processing.

By virtue of the present embodiment as described above, on an operation screen for displaying wireless communication parameters, it is possible to appropriately change a display of a QR code that includes wireless communication parameters in accordance with an instruction by a user. By this, in the communication apparatus 100, it is possible to appropriately display on the operation unit 213 a QR code that corresponds to an application used to read QR codes that operates on a mobile terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-217511, filed Nov. 10, 2017, which is hereby incorporated by reference herein in its entirety.

What is claimed is:

1. A communication apparatus, comprising:
at least one memory that stores a set of instructions; and
at least one processor that executes the instructions, the instructions, when executed, causing the information processing apparatus to perform operations comprising:
accepting from a user a display setting regarding display of a two-dimensional code in which one or more parameters related to communication with the communication apparatus are encoded and which is to be read by a mobile terminal;
determining, based on the accepted display setting, a parameter set that includes one or more parameters to be encoded in the two-dimensional code among a plurality of parameters related to communication with the communication apparatus; and
displaying, on a display unit of the communication apparatus, a screen that includes the two-dimensional code in which the determined parameter set is encoded,
wherein in a case where the accepted display setting is a first setting, a first two-dimensional code for a first application in which a first parameter set corresponding to the first setting is encoded is displayed on the screen, and in a case where the accepted display setting is a second setting, a second two-dimensional code for a second application in which a second parameter set corresponding to the second setting is encoded and which is different from the first two-dimensional code is displayed on the screen, and
wherein the first two-dimensional code includes a parameter that is not included in the second two-dimensional code.

2. The communication apparatus according to claim 1, wherein in a case where the accepted display setting is a third setting, a third two-dimensional code is displayed that can be interpreted by a plurality of applications.

3. The communication apparatus according to claim 2, wherein
the third two-dimensional code includes at least some parameters included in the first two-dimensional code, and at least some parameters included in the second two-dimensional code.

4. The communication apparatus according to claim 1, further comprising a storage device that stores the display setting, wherein the display setting stored in the storage device is changed according to acceptance of setting from a user who has administrator authority in the communication apparatus.

5. The communication apparatus according to claim 1, further comprising a storage device that stores, as a setting for each user of the communication apparatus, the display setting of the user,
wherein the display setting that corresponds to a user who has logged in to the communication apparatus and that is stored in the storage device is changed according to acceptance of setting from the user who has logged in to the communication apparatus,
wherein a two-dimensional code that corresponds to the display setting stored for a user who has logged in to the communication apparatus is displayed on the screen.

6. The communication apparatus according to claim 1, wherein
the first parameter set includes a parameter needed for the mobile terminal to make a wireless connection to a wireless access point that can communicate with the communication apparatus via a wired network.

7. The communication apparatus according to claim 1, wherein
the first parameter set includes a parameter needed for the mobile terminal to make a direct wireless connection to the communication apparatus.

8. The communication apparatus according to claim 7, further comprising a printing device,
wherein the operations further comprising establishing a direct wireless connection between the communication apparatus and the first application that is installed on the mobile terminal and that has read the first two-dimensional code displayed in the screen, wherein the established connection can be used for the mobile terminal to transmit a print instruction to the communication apparatus.

9. The communication apparatus according to claim 1, wherein the two-dimensional code is a Quick Response (QR) code.

10. A method of controlling a communication apparatus, the method comprising:
accepting from a user a display setting regarding display of a two-dimensional code in which one or more parameters related to communication with the communication apparatus are encoded and which is to be read by a mobile terminal;
determining, based on the accepted display setting, a parameter set that includes one or more parameters to be encoded in the two-dimensional code among a plurality of parameters related to the communication with the communication apparatus; and
displaying on a display unit of the communication apparatus, a screen that includes the two-dimensional code in which the determined parameter set is encoded,
wherein in a case where the accepted display setting is a first setting, a first two-dimensional code for a first application in which a first parameter set corresponding to the first setting is encoded is displayed on the screen, and in a case where the accepted display setting is a second setting, a second two-dimensional code for a second application in which a second parameter set corresponding to the second setting is encoded and which is different from the first two-dimensional code is displayed on the screen, and
wherein the first two-dimensional code includes a parameter that is not included in the second two-dimensional code.

11. A non-transitory computer-readable storage medium storing a computer program for causing a computer to execute a method of controlling a communication apparatus, the method comprising:
accepting from a user a display setting regarding display of a two-dimensional code in which one or more parameters related to communication with the communication apparatus are encoded and which is to be read by a mobile terminal;
determining, based on the accepted display setting, a parameter set that includes one or more parameters to be encoded in the two-dimensional code among a plurality of parameters related to the communication with the communication apparatus; and
displaying on a display unit of the communication apparatus, a screen that includes the two-dimensional code in which the determined parameter set is encoded,
wherein in a case where the accepted display setting is a first setting, a first two-dimensional code for a first application in which a first parameter set corresponding to the first setting is encoded is displayed on the screen, and in a case where the accepted display setting is a second setting, a second two-dimensional code for a second application in which a second parameter set corresponding to the second setting is encoded and which is different from the first two-dimensional code is displayed on the screen, and
wherein the first two-dimensional code includes a parameter that is not included in the second two-dimensional code.

* * * * *